US010105657B2

(12) United States Patent
Moon et al.

(10) Patent No.: US 10,105,657 B2
(45) Date of Patent: Oct. 23, 2018

(54) SEPARATION MEMBRANE, HYDROGEN SEPARATION MEMBRANE INCLUDING THE SEPARATION MEMBRANE, AND METHOD OF MANUFACTURING THE SEPARATION MEMBRANE

(71) Applicant: SAMSUNG ELECTRONICS CO., LTD., Suwon-si, Gyeonggi-do (KR)

(72) Inventors: Kyoung-Seok Moon, Hwaseong-si (KR); Keunwoo Cho, Hwaseong-si (KR); Kwanghee Kim, Seoul (KR); Hyeon Cheol Park, Hwaseong-si (KR); Eun Seog Cho, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 185 days.

(21) Appl. No.: 14/916,714

(22) PCT Filed: Sep. 5, 2014

(86) PCT No.: PCT/KR2014/008425
§ 371 (c)(1),
(2) Date: Mar. 4, 2016

(87) PCT Pub. No.: WO2015/034329
PCT Pub. Date: Mar. 12, 2015

(65) Prior Publication Data
US 2016/0193571 A1 Jul. 7, 2016

(30) Foreign Application Priority Data

Sep. 6, 2013 (KR) .................. 10-2013-0107487

(51) Int. Cl.
*B01J 20/28* (2006.01)
*B01D 71/02* (2006.01)
(Continued)

(52) U.S. Cl.
CPC ......... *B01D 71/022* (2013.01); *B01D 53/228* (2013.01); *B01D 69/145* (2013.01);
(Continued)

(58) Field of Classification Search
CPC ............ B01D 71/022; B01D 2257/502; B01D 2256/16; B01D 2257/504; B01D 53/228;
(Continued)

(56) References Cited

U.S. PATENT DOCUMENTS 7,789,948 B2   9/2010 Nakamura et al.
8,147,596 B2 * 4/2012 Fukui ................................. 96/4
(Continued)

FOREIGN PATENT DOCUMENTS

JP   2006055831 A   3/2006
JP   2008229564 A   10/2008
(Continued)

OTHER PUBLICATIONS

Dolan et al., "The effect of Ti on the microstructure, hydrogen absorption and diffusivity of V—Ni alloy membranes", Journal of Membrane Science, vol. 415-416, 2012, pp. 320-327.
(Continued)

*Primary Examiner* — Haytham Soliman
(74) *Attorney, Agent, or Firm* — Cantor Colburn LLP

(57) ABSTRACT

Disclosed are a separation membrane including a Group 5-based alloy, wherein crystal particles in the alloy have an average minor axis length of about 3 μm to about 10 μm and an aspect ratio of about 1:8 to 1:20, wherein the alloy is represented by the following Chemical Formula 1, and a method of manufacturing the same.

$A_xB_yC_z$ (Chemical Formula 1)

In Chemical Formula 1, A is vanadium, niobium, or tantalum, B and C are same or different and are independently
(Continued)

selected from nickel (Ni), aluminum (Al), iron (Fe), cobalt (Co), manganese (Mn), iridium (Ir), palladium (Pd), and platinum (Pt), x is a real number of greater than or equal to about 0.8 and less than 1, y+z=1−x, and y and z are independently real numbers of greater than or equal to about 0.

17 Claims, 7 Drawing Sheets

(51) Int. Cl.
    *C01B 3/50*     (2006.01)
    *C01B 13/02*     (2006.01)
    *B01D 53/22*     (2006.01)
    *B01D 69/14*     (2006.01)
    *C22C 27/02*     (2006.01)
    *C22F 1/18*     (2006.01)

(52) U.S. Cl.
    CPC ............ *C01B 3/503* (2013.01); *C01B 3/505* (2013.01); *C01B 13/0207* (2013.01); *C22C 27/025* (2013.01); *C22F 1/18* (2013.01); *B01D 2256/16* (2013.01); *B01D 2257/502* (2013.01); *B01D 2257/504* (2013.01); *B01D 2325/04* (2013.01); *B01D 2325/10* (2013.01); *B01D 2325/20* (2013.01); *C01B 2203/0405* (2013.01); *Y02C 10/10* (2013.01); *Y02P 20/152* (2015.11)

(58) Field of Classification Search
    CPC ............ B01D 69/145; B01D 2325/20; B01D 2325/10; B01D 2325/04; C22F 1/18; C22C 27/025; C01B 3/503; C01B 13/0207; C01B 3/505; C01B 2203/0405; Y02C 10/10; Y02P 20/152

USPC ........................... 502/4; 95/56, 55
See application file for complete search history.

(56) References Cited

U.S. PATENT DOCUMENTS

| 2005/0053826 A1* | 3/2005 | Wang ............... B82Y 30/00 427/115 |
|---|---|---|
| 2009/0176012 A1 | 7/2009 | Way et al. |
| 2010/0018397 A1 | 1/2010 | Ishibe et al. |
| 2012/0138196 A1 | 6/2012 | Yamamura et al. |
| 2013/0206002 A1 | 8/2013 | Park et al. |

FOREIGN PATENT DOCUMENTS

| KR | 1020080047603 A | 5/2008 |
| KR | 1020120037979 A | 4/2012 |
| KR | 101155998 B1 | 6/2012 |
| KR | 1020120060987 A | 6/2012 |
| KR | 101176585 B1 | 8/2012 |
| WO | 2015034329 A1 | 3/2015 |

OTHER PUBLICATIONS

International Search Report for PCT/KR2014/008425 dated Jan. 7, 2015.
Kim et al., "Grain Growth Control and Solid-State Crystal Growth by Li2O/PbO Addition and Dislocation Introduction the PMN-35PT System", J. Am. Ceram. Soc., vol. 8, No. 4, 2006, pp. 1237-1243.
M.D.Dolan, "Non-Pd BCC alloy membranes for industrial hydrogen separation", Journal of Membrane Science, vol. 362, 2010, pp. 12-28.
Song et al., "Influence of processing conditions on the microstructure and permeability of BCC V—Ni membranes", Journal of Membrane Science, vol. 363, 2010, pp. 309-315.

\* cited by examiner

[FIG. 1]
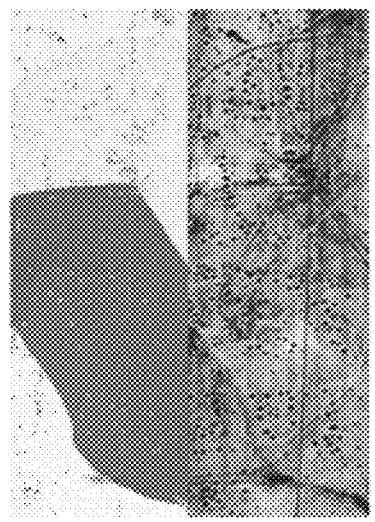
(a)
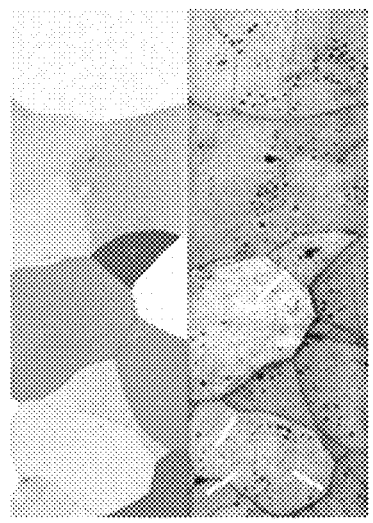
(b)
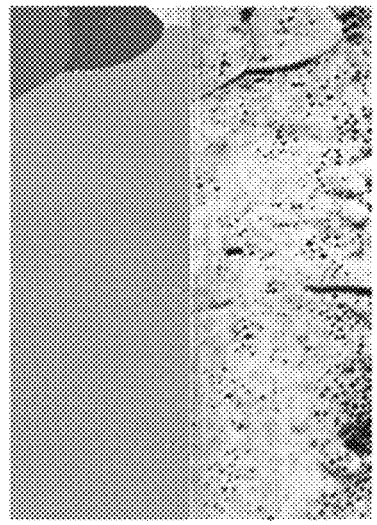
(c)
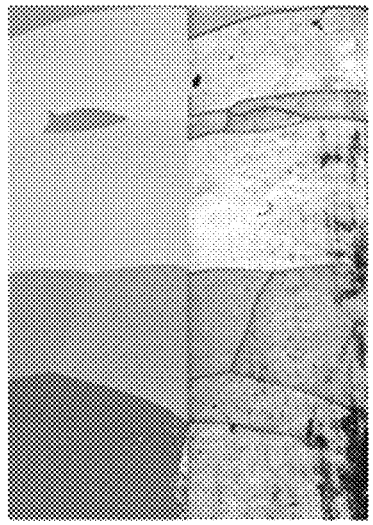
(d)

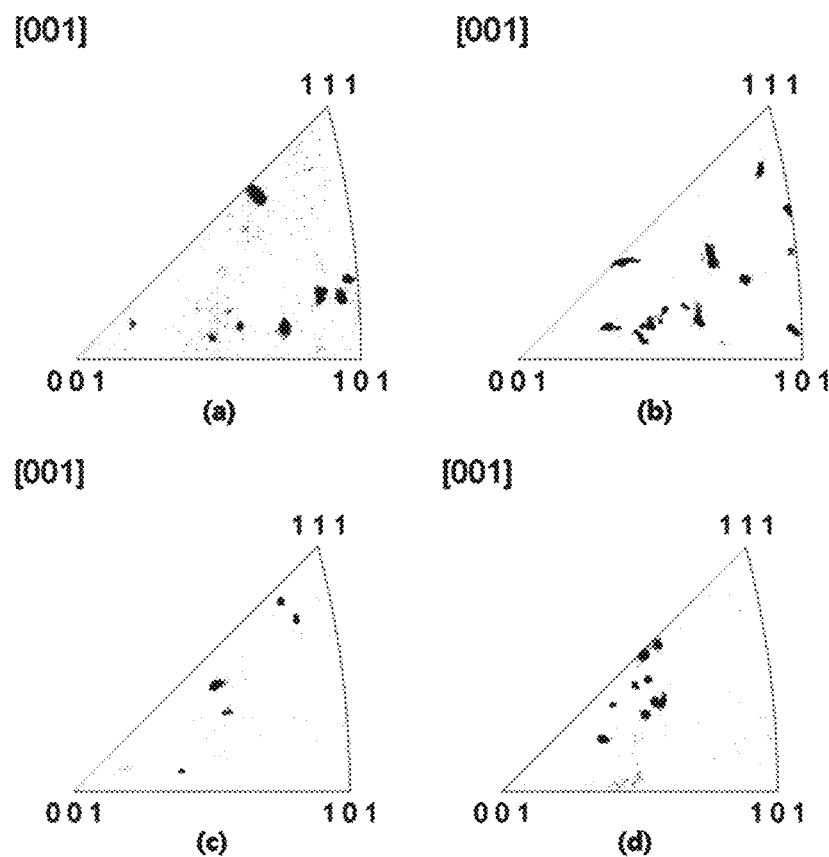
[FIG. 2]

[FIG. 3]
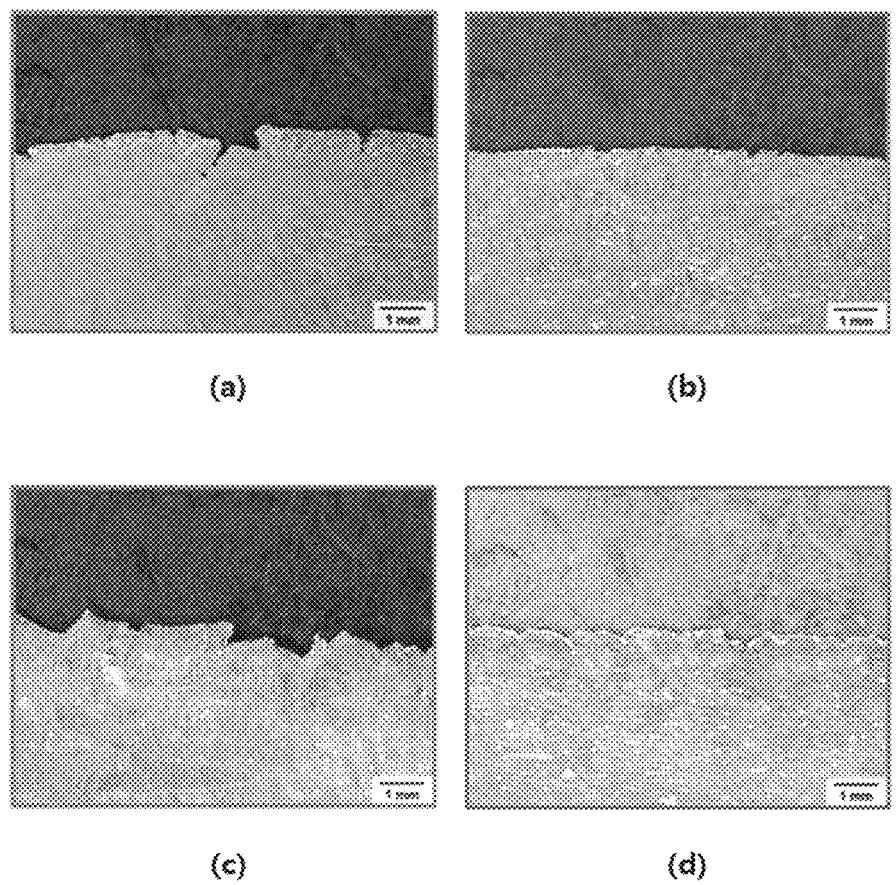

[FIG. 4]
|     | Longest edge crack length (mm) | Reduction ratio (%) |
|-----|-------------------------------|---------------------|
| (a) | < 4 mm                        | ~55%                |
| (b) | < 0.2 mm                      | ~70%                |
| (c) | < 2 mm                        | ~67%                |
| (d) | < 1 mm                        | ~65%                |
[FIG. 5]
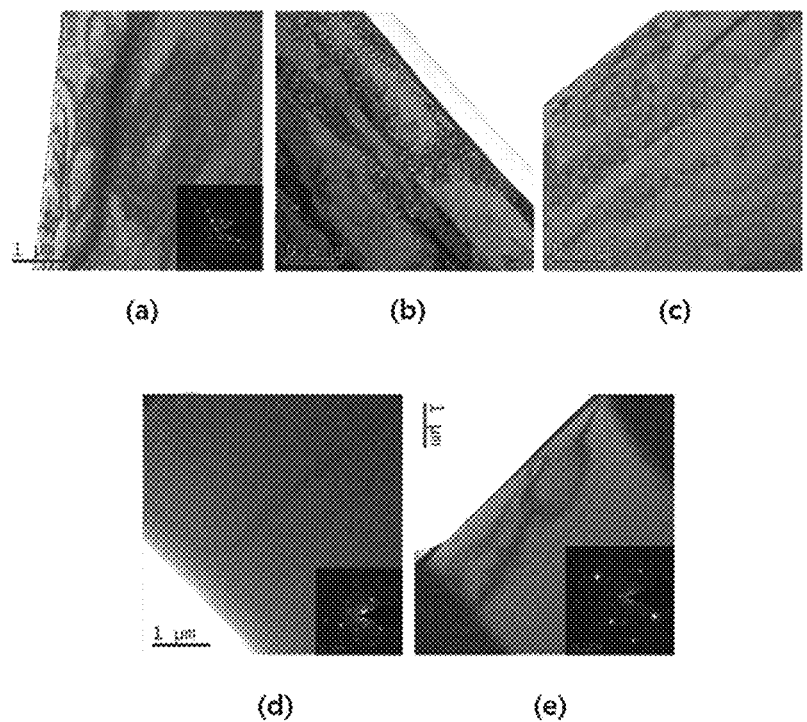

[FIG. 6]
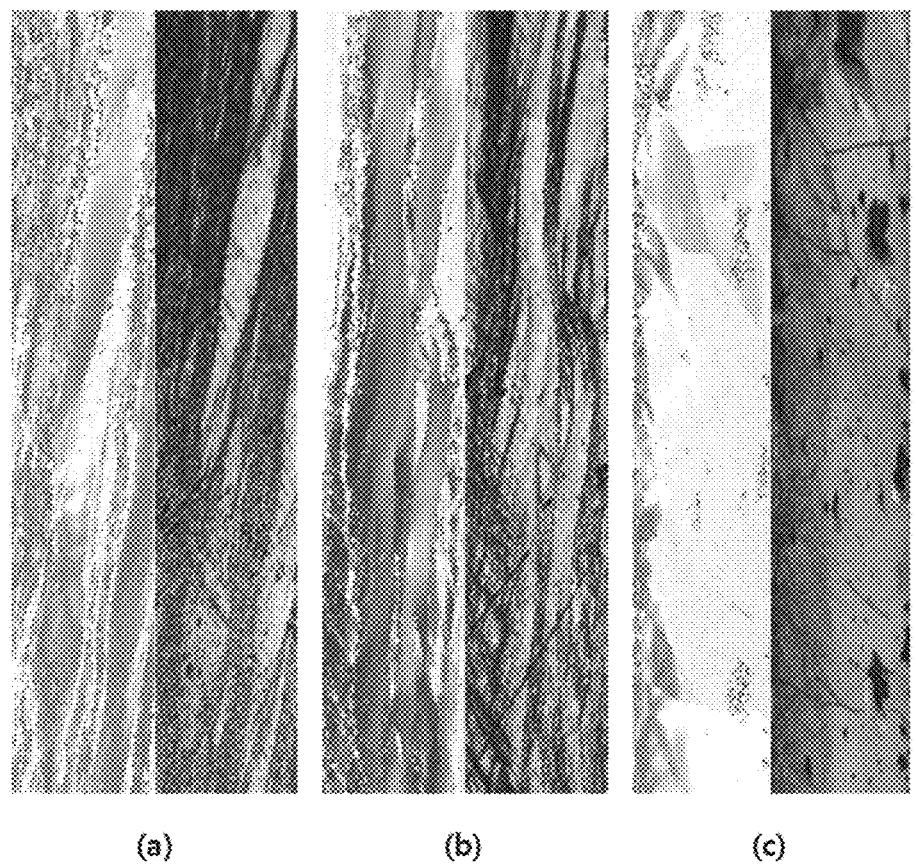
(a)  (b)  (c)

[FIG. 7]
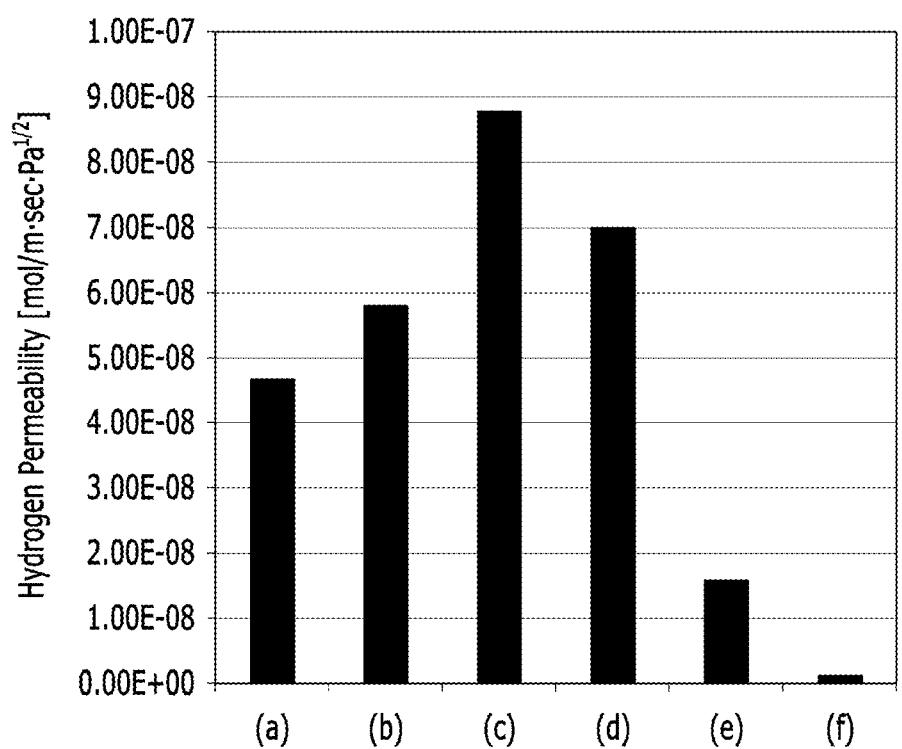

[FIG. 8]
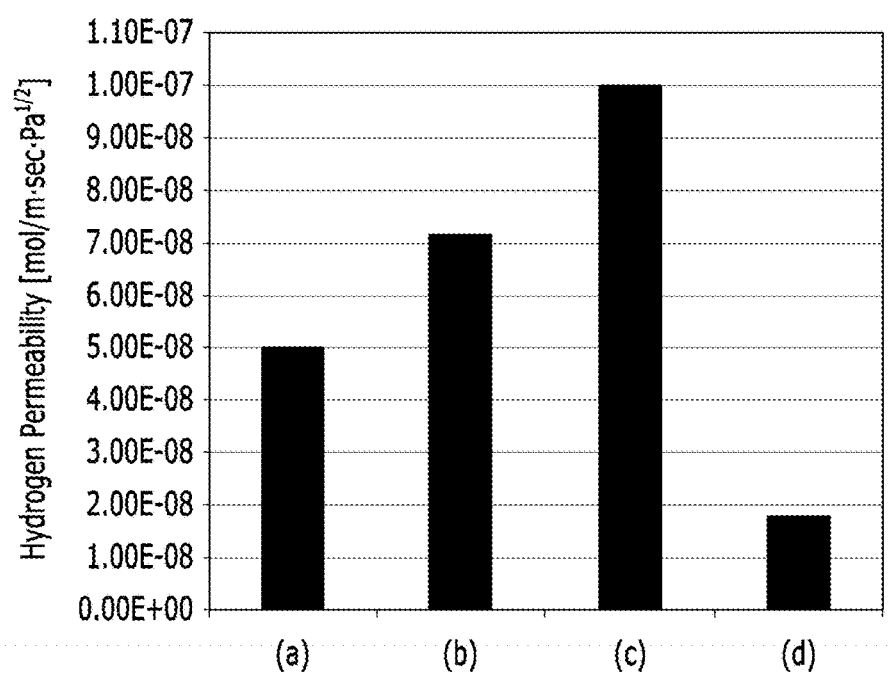

SEPARATION MEMBRANE, HYDROGEN SEPARATION MEMBRANE INCLUDING THE SEPARATION MEMBRANE, AND METHOD OF MANUFACTURING THE SEPARATION MEMBRANE

This application is a U.S. national stage application of International Application No. PCT/KR2014/008425, filed on Sep. 5, 2014, and claims priority to and the benefit of Korean Patent Application No. 10-2013-0107487, filed on Sep. 6, 2013, and all the benefits accruing therefrom under 35 U.S.C. § 119, the contents of which are incorporated herein in their entirety by reference.

TECHNICAL FIELD

A separation membrane, a hydrogen separation membrane including the same, and a method of manufacturing the separation membrane are disclosed.

BACKGROUND ART

Recently, hydrogen has been in the spotlight as a clean energy source.

A hydrogen separation membrane selectively separates hydrogen from a hydrogen-containing mixed gas including hydrogen, carbon monoxide, carbon dioxide, and the like, and thus is used for high purity hydrogen production.

As for a hydrogen separation membrane, a polymer, a ceramic, a metal, and the like have been developed, and in particular, a metal hydrogen separation membrane has very high purity hydrogen selectivity and may produce high purity hydrogen.

The representative application field of using hydrogen separation includes gas separation after reforming town gas for applying it to a fuel cell, and high purity hydrogen purification for a semiconductor process, besides coal gasification and SMR (steam methane reforming).

DISCLOSURE

Technical Problem

One embodiment of the present invention provides a separation membrane that may suppress hydrogen embrittlement fractures and has excellent hydrogen permeability.

Another embodiment of the present invention provides a hydrogen separation membrane including the separation membrane.

Yet another embodiment of the present invention provides a method of manufacturing the separation membrane.

Technical Solution

According to one embodiment, a separation membrane including a Group 5-based alloy is provided, wherein crystal particles in the alloy have an average minor axis length of about 3 μm to about 10 μm, and an aspect ratio of about 1:8 to about 1:20.

The crystal particles in the alloy have an average minor axis length of about 5 μm and an aspect ratio of about 1:10.

The Group 5-based alloy may be an alloy of vanadium (V), niobium (Nb), or tantalum (Ta).

The Group 5-based alloy may include a mixing element of nickel (Ni), aluminum (Al), iron (Fe), cobalt (Co), manganese (Mn), iridium (Ir), palladium (Pd), platinum (Pt), or a combination thereof, in addition to vanadium (V), niobium (Nb), or tantalum (Ta).

The Group 5-based alloy may include a mixing element of Ni, Al, Fe, Pt, Ir, or a combination thereof, in addition to vanadium (V).

The Group 5-based alloy may include the mixing element in an amount of less than or equal to about 20 atom % based on the total atoms of the Group 5-based alloy.

The Group 5-based alloy may be represented by the following Chemical Formula 1.

$$A_xB_yC_z \qquad \text{(Chemical Formula 1)}$$

In the above Chemical Formula 1,
A is vanadium, niobium, or tantalum,
B and C are the same or different and may be independently selected from nickel (Ni), aluminum (Al), iron (Fe), cobalt (Co), manganese (Mn), iridium (Ir), palladium (Pd), and platinum (Pt),
x is a real number of greater than or equal to about 0.8 and less than 1,
y+z=1−x, and y and z are independently real numbers of greater than or equal to about 0.

In the above Chemical Formula 1, A may be vanadium (V), B may be nickel (Ni) or aluminum (Al), and C may be platinum (Pt) or iron (Fe).

In the above Chemical Formula 1, x may be about 0.85 to about 0.95, y may be about 0.03 to about 0.08, and z may be about 0.01 to about 0.06.

The alloy may be a V—Ni—Pt alloy or a V—Al—Fe alloy.

The Group 5-based alloy may have a crystal structure of a body-centered cubic structure.

The body-centered cubic structure may have a lattice constant of about 3.2 Å to about 3.4 Å.

The separation membrane may have a dense layer structure having porosity of less than about 1 volume %.

A thickness of the separation membrane may be about 1 μm to about 1000 μm.

According to another embodiment of the present invention, a hydrogen separation membrane including the separation membrane is provided.

Hydrogen permeability of the hydrogen separation membrane may be about $1.0 \times 10^{-8}$ to about $1.0 \times 10^{-7}$ mol/m*s*Pa$^{1/2}$ under a temperature condition of 300° C. to 500° C.

The hydrogen separation membrane may further include a catalyst layer formed on one side or both sides of the separation membrane.

The catalyst layer may include at least one selected from Pd, Pt, Ru, Ir, and a combination thereof.

According to another embodiment, a method of manufacturing a separation membrane including a Group 5-based alloy is provided, including cold rolling a Group 5-based alloy after heat-treating the same so that crystal particles in the alloy have an average diameter of about 180 μm to about 220 μm.

The manufacturing method may further include performing a further heat treatment after the cold rolling to provide crystal particles in the alloy having an average minor axis length of about 3 μm to about 10 μm and having an aspect ratio of about 1:8 to about 1:20.

The further heat treatment after the rolling may be performed to provide the crystal particles in the alloy having an average minor axis length of about 5 μm and an aspect ratio of about 1:10.

The heat treatment before the cold rolling may be performed at a temperature of between about 500° C. and about 800° C., for example at a temperature of between about 550° C. and about 750° C., and specifically at a temperature of between about 600° C. and about 700° C.

The further heat treatment after the cold rolling may be performed at a temperature of between about 500° C. and about 800° C., for example at a temperature of between about 550° C. to about 750° C., and specifically at a temperature of between about 600° C. and about 700° C.

Advantageous Effects

The separation membrane including the Group 5-based alloy according to one embodiment may be fabricated in a thin thickness of about 1 μm to about 1000 μm, thus the hydrogen separation membrane including the same has high hydrogen permeability.

DESCRIPTION OF DRAWINGS

FIG. 1 shows EBSD (electron backscatter diffraction) photographs showing the microcrystalline structure of a V—Ni—Pt alloy according to Example 1, wherein (a) shows a state of the alloy according to Example 1 which does not undergo heat treatment after arc melting; and (b), (c), and (d) show a state of the alloy which undergoes heat treatment at 600° C. (b), at 800° C. (c), and at 1000° C. (d), respectively, for 10 minutes.

FIG. 2 shows inverse pole figures of each alloy shown in FIG. 1.

FIG. 3 shows optical photographs showing how edge cracking of alloys according to Example 1 is generated after cold rolling, wherein (a) shows how edge cracking of an alloy which undergoes no heat treatment after the arc melting and then undergoes cold rolling is generated; and (b) to (d) show how edge cracking of alloys which undergo cold rolling after undergoing heat treatment at 600° C. (b), 800° C. (c), and 1000° C. (d), respectively, for 10 minutes after arc melting (d), is generated.

FIG. 4 is a table showing a maximum edge crack length of the alloys shown in FIG. 3 after performing the cold rolling and a reduction ratio on the cold rolling.

FIG. 5 shows TEM (transmittance electron microscope) photographs for measuring the microcrystalline structure of each specimen obtained by slicing the alloys according to Example 1 at a thickness of about 400 μm, that is cooled after undergoing the arc melting, and then (a) undergoing cold rolling without performing pre-heat-treatment; (b) undergoing arc melting and heat treatment in a vacuum furnace at 600° C. for 10 minutes and cold rolling to provide a metal strip; and for the specimens of (b) obtained by further performing heat treatment (c) at 600° C., (d) at 1000° C., and (e) at 1200° C.

FIG. 6 shows EBSD photographs for observing the microcrystalline structure of each alloy specimen obtained by performing the arc melting of the alloy according to Example 1, cooling and slicing the same at a thickness of 400 μm, performing heat treatment in a vacuum furnace at 600° C. for 10 minutes, and cold rolling the same to provide a metal strip, and then (a) by performing no further heat treatment; and (b) and (c) by subjecting the specimen of (a) to further heat treatment (b) at 600° C., and (c) at 1200° C., respectively.

FIG. 7 is a graph showing hydrogen permeability of a hydrogen separation membrane obtained from Example 3 including the alloy according to Example 1.

FIG. 8 is a graph showing hydrogen permeability of a hydrogen separation membrane obtained from Example 3 including the alloy according to Example 2.

BEST MODE

This disclosure will be described more fully hereinafter in the following detailed description, in which some but not all embodiments of this disclosure are described.

However, this disclosure may be embodied in many different forms, and is not construed as limited to the exemplary embodiments set forth herein.

The described embodiments may be modified in various different ways, and may be described referring to drawings as needed, but the present disclosure is not limited to the embodiments.

The size and thickness of each constituent element as shown in the drawings are randomly indicated for better understanding and ease of description, and this disclosure is not necessarily limited to as shown.

The size and thickness of each constituent element as shown in the drawings are randomly exaggeratedly indicated for better understanding and ease of description, and this disclosure is not necessarily limited to as shown.

One embodiment provides a separation membrane including a Group 5-based alloy, wherein a crystal particle in the alloy has an average minor axis length of about 3 μm to about 10 μm, and an aspect ratio of about 1:8 to about 1:20.

In an exemplary embodiment, the crystal particle in the alloy may have an average minor axis length of about 5 μm, and an aspect ratio of about 1:10.

The alloy separation membrane including the crystal particle may be fabricated by a cold rolling process, and the obtained separation membrane may have a thickness of about 1 μm to about 1000 μm.

The separation membrane including the Group 5-based alloy according to the embodiment may be used as a hydrogen separation membrane selectively separating only hydrogen gas, so another embodiment relates to a hydrogen separation membrane including the separation membrane.

The Group 5-based metal has larger hydrogen affinity than a metal having hydrogen dissociation capability such as palladium (Pd) and thus has hydrogen-containing capability, and has an excellent hydrogen diffusion characteristic through a small lattice of a body-centered cubic structure, and in general, about 10 to 100 times the hydrogen permeation performance of the Pd-based alloys (J. Membr. Sci., 362, 12-28, 2010).

However, hydrogen reacts with the Group 5-based metal in the separation membrane including the Group 5-based metal to provide a metal hydride phase, thus causing cracks due to volume expansion to induce fractures.

In order to solve the hydrogen embrittlement problem, the Group 5-based metal is required to be alloyed (M. D. Dolan et al., Journal of Membrane Science, 415-416, 2012, 320-327). In this alloying case, ductility is decreased by the solid solution strengthening.

Hydrogen flux refers to a hydrogen amount passing through the separation membrane per unit time and unit area, and the hydrogen flux is affected by the performance (permeability, thickness, or the like) of the hydrogen separation membrane, and is an important performance index determining hydrogen permeation efficiency.

In order to increase the hydrogen flux with the separation membrane having the same components, the thickness of the separation membrane may be reduced, so a rolling process is widely used in the process for providing a separation membrane having high capacity and a wide area.

The pure Group 5-based metal is relatively easily plastic-deformed by the rolling process, but when the alloy element is added into the Group 5-based metal in order to improve the hydrogen embrittlement resistance, the ductility is reduced by the solid solution strengthening, and thereby the plastic deformation, which is a rolling process, is difficult.

In order to facilitate the plastic deformation of metal, studies have been undertaken on performing the hot rolling before the cold rolling, and on increasing the ductility of a material by performing the heat treatment before the cold rolling.

However, the case of the hot rolling has drawbacks of oxidation, high cost facilities, difficulty in accomplishing a thin thickness (less than or equal to several mm), and in the case of the heat treatment before the cold rolling, the process conditions are not yet established.

In addition, in order to increase the hydrogen flux, if the thickness of the separation membrane is decreased by the plastic deformation, problems of internal dislocation defects, stress, and the like may be caused to decrease the hydrogen permeation performance, so a further process for recovering the performance of the separation membrane is required after the plastic deformation by rolling the same.

The separation membrane according to the embodiment includes a Group 5-based alloy of which a crystal particle has an average minor axis length of about 3 μm to about 10 μm and an aspect ratio of about 1:8 to about 1:20, and it is confirmed that the hydrogen separation membrane including the Group 5-based alloy has significantly improved hydrogen flux.

The separation membrane according to the embodiment may be obtained according to a method of manufacturing a separation membrane including a cold rolling process, so another embodiment relates to a method of manufacturing the separation membrane including the cold rolling process.

Specifically, the method of manufacturing a separation membrane includes heat-treating a Group 5-based alloy to provide a crystal particle in the alloy with an average diameter of about 180 μm to about 220 μm and cold rolling the same.

In other words, before the cold rolling, by including the heat treatment process to provide the crystal particle of the Group 5-based alloy having an average particle size within the range, it is confirmed that the separation membrane is fabricated to have sufficient hydrogen permeation performance by cold rolling the Group 5-based alloy.

Specifically, the heat treatment process before the cold rolling may be performed at a temperature between about 500° C. and about 800° C., for example, between about 550° C. and about 750° C., and as another example, between about 600° C. and about 700° C., but the temperature may be changed depending upon the alloy components.

It is understood that the temperature range is totally different from the temperature range which is conventionally known for heat treatment at a temperature of greater than or equal to about 1000° C. to grow the size of crystal particles in the alloy, in order to facilitate the dislocation movement and to reduce the grain boundary.

According to one embodiment, the cold rolling process is carried after performing the heat treatment within the temperature range, so the alloy structure is less cracked, and the reduction ratio in the cold rolling reaches about 70%.

Hereinafter, referring to FIG. 1 to FIG. 4, how the mechanical characteristics of alloy structure are changed according to the heat treatment before the cold rolling is explained in detail.

FIG. 1 and FIG. 2 are photographs of microcrystalline structures (FIG. 1) and inverse pole figures (FIG. 2) through EBSD (electron backscatter diffraction) of an alloy which is not heat-treated before the cold rolling (a) or alloys which are heat treated at different temperatures ((b) to (d)), wherein the alloy is prepared by mixing V (vanadium), Ni (nickel), and Pt (platinum) at a ratio of 92:6:2, respectively, according to Example 1.

Referring to FIG. 1, (a) shows a state in which the alloy is arc-melted; (b) shows a state in which the alloy undergoes heat treatment at 600° C. for 10 minutes after the arc melting; (c) shows a state in which the alloy is arc melted and undergoes heat treatment at 800° C. for 10 minutes; and (d) shows a microcrystalline structure of the alloy after performing the arc melting and the heat treatment at 1000° C. for 10 minutes.

As understood from FIG. 1, in the case of heat-treating at 600° C., the crystal particles in the alloy have a more random directional property than that after the arc melting, and the particle size is decreased in the range of about 180 μm to about 220 μm.

In the case of after the arc melting, a lot of an amorphous part is found, but the amorphous part is significantly decreased after the heat treatment at greater than or equal to about 600° C.

Through rapid cooling after the heat treatment, it appears that the amorphous part is effectively removed.

In the case of the heat treatment at about 800° C., very large crystal particles are formed (c), and some small particles are also found.

This is not a normal particle growth status of the crystal particles, so it is determined that the temperature of around 800° C. is determined as a temperature having threshold growth power.

When the heat treatment is performed at greater than or equal to about 1000° C., it is not found that only some of the crystal particles are grown, such that it appears that all particles are grown even though in a smaller size than that of the largest particles grown at 800° C., due to inter-particle collision of growing crystal particles caused by increasing the nuclear generating sites since the threshold growth power is decreased (M.-S. Kim, J. G. Fisher, and S.-J. L. Kang, J. Am. Ceram. Soc., 89, 2006, 1237).

Further, in the case of 600° C. (b), it may be judged that the first abnormal particle growth occurs and completed.

The abnormal particle growth is found when crystal particles are arranged atomically to provide an edged structure (S.-J. L. Kang, Sintering: Densification, Grain Growth and Microstructure. Oxford, UK Elsevier Butterworth-Heinemann, 2005.), and in FIG. 1(b), the parts shown by yellow arrows refer to formation of a singular grain boundary.

FIG. 2 shows inverse pole figures (body-centered cubic) of the alloys shown in FIG. 1.

Referring to FIG. 2, it is found that the small crystal particles are formed by heating the arc melted specimen (a) at about 600° C. and grown to increase the overall crystal direction (b), but the particles are coarsened and have the crystal direction oriented in a predetermined direction due to the Oswald ripening phenomenon when increasing the heat treatment temperature to about 800° C. (c) and about 1000° C. (d).

It is assessed that the plastic deformation (rolling) becomes difficult when the crystal particles in the alloy are arranged in the oriented direction as above.

FIG. 3 shows optical photographs of an alloy which is cold rolled after performing the heat treatment or not performing the heat treatment, wherein (a) shows a state of an alloy which is cold rolled by rapid cooling right after the arc melting the alloy according to Example 1 without the heat treatment; (b) shows a state of an alloy which is cold rolled after performing the heat treatment at about 600° C. for about 10 minutes, (c) shows a state of an alloy which is cold rolled after performing the heat treatment at about 800° C. for 10 minutes, and (d) shows a state of an alloy which is cold rolled after performing the heat treatment at about 1000° C. for about 10 minutes.

As shown in FIG. 3, it is understood that edge cracking of an alloy occurs less when it is rolled after the heat treatment than when rolled without the heat treatment, and the edge cracking is remarkably decreased in the case of performing the heat treatment at about 600° C. compared to at about 800° C.

FIG. 4 is a table showing the maximum edge crack lengths and reduction ratios of alloys shown in FIG. 3 after the cold rolling.

As shown in FIG. 4, it is understood that the maximum edge crack length after cold rolling is increased up to about 4 mm which is the largest in the case of being rolled without performing the heat treatment after the arc melting, and the edge crack is less than 0.2 mm which is the smallest in the case of being rolled after performing the heat treatment at about 600° C.

When comparing the reduction ratios as the final thickness after being rolled, the reduction ratio is less than or equal to about 55% in the case of being cold rolled without performing the heat treatment, but the reduction ratio is improved up to about 70% in the case of performing the heat treatment at about 600° C., and the reduction ratio is also improved up to about 67% in the case of performing the heat treatment at about 800° C.

It is assessed that the results are exhibited because the crystal directional property is enhanced to facilitate slip of the crystal particles while decreasing the crystal particle size by the heat treatment before the rolling.

As shown above, it is confirmed that the microcrystalline particles of the alloy may be deformed to have favorable mechanical characteristics for the cold rolling by heat treating a Group 5-based alloy at about 600° C. before the cold rolling.

By cold rolling the Group 5-based alloy which is deformed to have favorable mechanical characteristics for the cold rolling, it is possible to provide a separation membrane including the Group 5-based alloy in a thin thickness, wherein the Group 5-based alloy has been conventionally difficult to cold roll due to the ductility deterioration or difficult to be thinly plastic deformed in a desirable thickness.

On the other hand, the separation membrane including the cold rolled alloy may be fabricated into a hydrogen separation membrane by undergoing a further heat treatment process to recover the alloy performance, particularly, the hydrogen permeation performance by removing the defects and the remaining stress according to the dislocation movement caused by the plastic deformation (rolling).

Specifically, the manufacturing method of separation membrane may include a further heat treatment at a temperature of between about 500° C. and about 800° C., for example, between about 550° C. and about 750° C., and for another example, between about 600° C. and about 700° C. after the cold rolling.

By performing the further heat treatment within the temperature range, the defects and the remaining stress of crystal particles in the alloy according to the dislocation movement may be removed, so as to significantly improve the hydrogen permeation performance.

This is explained with reference to FIG. 5 to FIG. 8.

FIG. 5 shows photographs for observing the microcrystalline structure of specimens by TEM (transmittance electron microscope), wherein the specimens are obtained by arc melting the alloy according to Example 1 and cooling and slicing the same in a thickness of 400 um, wherein (a) shows a specimen which is cold rolled without performing the pre-heat treatment; (b) shows a specimen of a metal strip which is cold rolled after performing the heat treatment in a vacuum furnace at about 600° C. for about 10 minutes after the arc melting; and (c), (d), and (e) show specimens which undergo a further heat treatment at 600° C. (c), at 1000° C. (d), and at 1200° C. (e) for the specimen of (b).

From FIG. 5, it is found that an elongated structure is not formed in the microcrystalline structure of the specimen which is cold rolled without performing the pre-heat treatment (a).

The elongated structure refers to a structure formed when the length of crystal particles of the metal is extended in one direction according to rolling the metal.

It shows that the rolled structure is rarely formed when it is cold rolled without performing the pre-heat treatment.

It is found that the microcrystalline structure of the specimen which is cold rolled after performing the pre-heat treatment at about 600° C. (b) has the elongated structure, and some crystal particles have a minor axis length of about 100 nm.

The elongated structure is assessed to be formed when the small particles formed by the heat treatment at about 600° C. after rapid cooling are rolled.

In the case of performing the further heat treatment at about 600° C. for 1 hour after the cold rolling (c), it is found that the small particles of around 100 nm disappear due to the Ostwald ripening phenomenon, and the large particles are grown to extend in a crystal direction.

In the case of performing the further heat treatment at greater than or equal to about 1000° C. (d), it is observed that a single crystal like crystal is found with the TEM, and the particles are significantly grown.

It seems to have a micro-structure in which particles are continuously grown at greater than or equal to about 1000° C., and the grain boundary almost disappears.

In this case, according to the disclosure (G. Song et al., Journal of Membrane Science, 363, 2010, 309-315), it was anticipated that hydrogen is easily permeated since the grain boundary acting as trap site for hydrogen disappears, but the results show that is not true.

Like the case of performing the heat treatment at 600° C., the grain boundary acting as source and sink of material in the hydrogen permeation is required, and the optimal gap is needed in this case.

In other words, when the grain boundary gap is increased greater than or equal to the predetermined size, it is assessed to be unfavorable for the hydrogen diffusion.

FIG. 6 shows photographs for measuring the microstructure by EBSD of (a) the alloy specimen obtained by forming a metal strip with no further heat treatment, (b) the alloy specimen obtained by forming the metal strip with further heat treatment at 600° C., and (c) the alloy specimen obtained by forming the metal strip with further heat treatment at 1200° C., wherein the metal strips in (a) to (c) had been prepared by arc melting the alloy according to Example 1, cooling and slicing the same at a thickness of 400 μm, heat-treating it in a vacuum furnace at 600° C. for 10 minutes, and then cold rolling the same.

As shown in FIG. 6, it is found that micro-particles are present after the cold rolling (a), but the micro-particles disappear through the further heat treatment ((b) and (c)).

That is, in the case of performing the heat treatment at 1200° C. (c), the micro-particles are grown to the crystal particles from several tens of micrometers to greater than or equal to 100 μm, so the elongated structure formed on rolling is found to disappear.

In the case of performing the further heat treatment at about 600° C. (b), it is confirmed that the micro-particles disappear and the crystal particles are grown, but the elongated structure is maintained as it was.

In this case, the average length of minor axis of crystal particles is around 5 μm (standard deviation of about 2.3 μm), and an aspect ratio is around 1:10.

FIG. 7 is a graph showing hydrogen permeability of a hydrogen separation membrane including specimens in which the alloy according to Example 1 is arc melted, sliced to a thickness of 400 μm, undergoes heat treatment in a vacuum furnace at 600° C. for 10 minutes, and then cold rolled to provide a metal strip, and then (a) the metal strip undergoes no further heat treatment, or the metal strip undergoes further heat treatment at (b) about 400° C., (c) about 600° C., (d) about 800° C., (e) about 1200° C., and (f) about 1400° C., respectively.

Although not shown in the graph, a specimen that undergoes further heat treatment at about 1000° C. has hydrogen permeability of 0.

As shown in the results in the graph, it is found that the hydrogen separation membrane including the metal strip that undergoes heat treatment at greater than or equal to about 1000° C. after the cold rolling has lower hydrogen permeability than that of the specimen that undergoes no further heat treatment; on the other hand, the specimens that undergo further heat treatment at a temperature of less than or equal to about 1000° C. have improved hydrogen permeability.

FIG. 8 shows hydrogen permeability after performing the same test as in FIG. 7 for the V—Al—Fe alloy according to Example 2.

Specifically, according to the same procedure as for the V—Ni—Pt alloy, the arc melted specimens are sliced to a thickness of about 400 μm, they undergo heat treatment in a vacuum furnace at 600° C. for about 10 minutes, and are then cold rolled to provide metal strips, and then (a) the hydrogen separation membrane including a specimen that undergoes no further heat treatment, and specimens that undergo further heat treatment (b) at 600° C., (c) at 800° C., and (d) at 1400° C. for 1 hour or 30 minutes, respectively, are measured for hydrogen permeability.

Also in this case, although not shown in FIG. 8, a separation membrane including a specimen that undergoes further heat treatment at about 1000° C. has hydrogen permeability of 0.

From the results of the graph of FIG. 8, it is understood that the hydrogen separation membrane including the specimen that undergoes further heat treatment at greater than or equal to about 1000° C. has lower hydrogen permeability than that of the specimen that undergoes no heat treatment, but the hydrogen separation membranes including specimens that undergo further heat treatment at less than about 1000° C. have improved hydrogen permeability.

As described in above, by performing the heat treatment within the predetermined temperature range before the cold rolling according to one embodiment, the separation membrane may be fabricated by cold rolling a Group 5-based alloy; and an alloy separation membrane including crystal particles having a predetermined size and aspect ratio may be fabricated by including further heat treatment of the cold-rolled alloy in a predetermined temperature range and deforming the microcrystalline structure of the Group 5-based alloy.

The hydrogen separation membrane including the alloy separation membrane may have significantly improved hydrogen permeability.

The Group 5-based alloy may be an alloy of vanadium (V), niobium (Nb), or tantalum (Ta), and may include a mixing element of nickel (Ni), aluminum (Al), iron (Fe), cobalt (Co), manganese (Mn), iridium (Ir), palladium (Pd), platinum (Pt), or a combination thereof in addition to the vanadium (V), niobium (Nb), or tantalum (Ta).

The Group 5-based alloy maintains the crystal structure of a body-centered cubic structure by including the mixing element in an amount of less than or equal to 20 atom % in the Group 5-based alloy, and the body-centered cubic structure may have a lattice constant of about 3.2 to about 3.4 Å.

In an exemplary embodiment, the alloy may be represented by the following Chemical Formula 1.

$$A_xB_yC_z \qquad \text{(Chemical Formula 1)}$$

In the above Chemical Formula 1,

A is vanadium, niobium, or tantalum,

B and C are the same or different and may be independently selected from nickel (Ni), aluminum (Al), iron (Fe), cobalt (Co), manganese (Mn), iridium (Ir), palladium (Pd), and platinum (Pt), x is a real number of greater than or equal to about 0.8 and less than 1, y+z=1−x, and y and z are independently real numbers of greater than or equal to about 0.

In the above Chemical Formula 1, A may be vanadium (V), B may be nickel (Ni) or aluminum (Al), and C may be platinum (Pt) or iron (Fe).

In the above Chemical Formula 1, x may be about 0.85 to about 0.95, y may be about 0.03 to about 0.08, and z may be about 0.01 to about 0.06.

The separation membrane may have a dense layer structure having porosity of less than about 1 volume %, and a thickness of the separation membrane may be about 1 μm to about 1000 μm.

Hydrogen permeability of the hydrogen separation membrane may be about $1.0 \times 10^{-8}$ to about $1.0 \times 10^{-7}$ mol/m*s*Pa$^{1/2}$ under a temperature condition of 300° C. to 500° C.

Hereinafter, the embodiments are illustrated in more detail with reference to examples.

However, the following examples are provided for the purpose of descriptions and the present invention is not limited thereto.

Mode for Invention

Examples

Example 1: Preparation of V—Ni—Pt Separation Membrane

In order to provide a hydrogen separation membrane, the processes of preparing an alloy, cutting a specimen, heat treating, cold rolling, and heat treating are performed in order.

Specifically, the following processes are performed.

(1) Alloy preparation (arc melting) step: In order to prepare a vanadium (V) alloy, V, Ni, and Pt are allocated in a molar ratio of 92:6:2, and melted by an arc melting to provide an alloy.

(2) Specimen cutting step: The specimen is cut according to a wire discharge machining method to a thickness of 0.1 mm to 0.4 mm.

The permeability may be different depending upon the thickness deviation of the specimen position, so the thickness is within ±10%.

Then, the cut specimen is polished to a thickness of about 1 μm.

(3) Heat treatment step before cold rolling: The metal specimen obtained from (2) is heat-treated in a vacuum furnace before cold rolling.

The final temperature is maintained at 400° C. to 1200° C. for 10 minutes to 30 minutes at a heating and cooling speed of 5° C./min to 10° C./min.

(4) Cold rolling step: A load is sequentially increased from 300, to 600, and to 1200 kgf, and the number of passes is 4-5 per load.

(5) Further heat treatment step after cold rolling: The metal flake obtained by cold rolling after performing the pre-heat treatment at 600° C. is further heat-treated in a vacuum furnace.

The final temperature is maintained at 400° C. to 1400° C. for 10 minutes to 4 hours at a heating and cooling speed of 5° C./min to 10° C./min.

Example 2: Preparation of V—Al—Fe Separation Membrane

A separation membrane is prepared in accordance with the same procedure as in Example 1, except that 5 mol % of Al and 5 mol % of Fe are added to V instead of the Ni and Pt elements.

Evaluation 1: Confirmation of Micro-Structure of Alloy Separation Membrane

For the V—Ni—Pt separation membrane obtained from Example 1, specimens that undergo the pre-heat treatment before the cold rolling (step 3), the cold rolling (step 4), and the further heat treatment after the cold rolling (step 5), are evaluated with EBSD, TEM, and optical photographs, and the results are shown in FIG. 1 to FIG. 6.

Specifically, in FIG. 1, (a) shows the structure of the arc melted alloy; (b) shows the structure of the arc melted alloy after performing the heat treatment at 600° C. for 10 minutes; (c) shows the structure of the arc melted alloy after performing the heat treatment at 800° C. for 10 minutes; and (d) shows the micro-structure of the arc melted alloy after performing the heat treatment at 1000° C. for 10 minutes.

As shown in FIG. 1, when the heat treatment is performed at 600° C. before the cold rolling, the alloy has a more random directional property than that after the arc melting, and the particle size is also decreased.

A lot of the amorphous part is found after the arc melting, but the amorphous part is significantly decreased by the heat treatment at greater than or equal to about 600° C.

When performing the heat treatment at 800° C., very large particles are formed, and also small particles are partially present.

This is not a normal particle growing status, so a temperature around 800° C. is determined as a temperature having threshold growth power.

When the heat treatment is performed at greater than or equal to about 1000° C., it is not found that only some of the crystal particles are grown. This appears to be because a nuclear generating site is increased by decreasing the threshold growth power, so all particles are grown even though in smaller size than that of the largest particle at 800° C., due to the internal collision on growing the particles.

FIG. 2 is an inverse pole figure according to the heat treatment before the plastic deformation (rolling) (body-centered cubic).

Referring to FIG. 2, it is found that the overall crystal directional property is increased while the small particles are formed at 600° C. and growing (b), but the particles are coarsened and have the crystal direction oriented in a predetermined direction due to the Oswald ripening phenomenon when the heat treatment temperature is increased to 800° C. (c) and 1000° C. (d).

FIG. 3 shows the optical photograph results of a specimen that is cold rolled without performing the heat treatment (a), and specimens which are cold rolled after performing the pre-heat treatment at 600° C. (b), at 800° C. (c), and at 1000° C. (d) for 10 minutes each.

As shown in FIG. 3, the edge crack generation with the heat treatment is decreased compared to the case of rolling without performing the heat treatment, and the edge cracking is significantly more decreased in the case with the heat treatment at 600° C. (c) than the case with the heat treatment at 800° C. (b).

However, although not shown, also in the case of the conventional V—Al—Fe alloy according to Example 2 which is not cold rolled without the heat treatment, when performing the pre-heat-treatment at 600° C., the edge crack generation is decreased after the cold rolling, and the phenomenon in which the crack permeates into the inside to tear the metal strip disappears.

FIG. 4 is a table showing the maximum edge crack lengths and reduction ratios which are the cold rolling characteristics of specimens shown in FIG. 3.

From FIG. 4, it is understood that the case of performing the heat treatment at 600° C. before the cold rolling (b) has the shortest maximum edge crack length at 0.2 mm; and the case of performing the cold rolling without performing the heat treatment (a) has the longest maximum edge crack length at 4 mm.

In addition, the case of the cold rolling without performing the heat treatment (a) has a reduction ratio of less than or equal to about 50%, but the case of the cold rolling after performing the pre-heat-treatment at 600° C. (b) and 800° C. (c) improves the reduction ratio near about 70%.

FIG. 5 shows TEM photographs for observing the micro-structure by slicing the specimen cooled after the arc melting to a thickness of 400 μm, performing the heat treatment in a vacuum furnace at 600° C. for 10 minutes and performing the cold rolling to provide a metal strip (b), and further performing the heat treatment at 600° C. (c), at 1000° C. (d), and at 1200° C. (e), respectively.

The specimen (a) is a specimen which is cold rolled without performing the pre-heat-treatment.

From the micro-structure of the specimen which is cold rolled without performing the pre-heat-treatment (a), it is found that the elongated structure is not formed.

This shows that the rolling is not performed well.

From the micro-structure of the specimen which is cold rolled after the pre-heat-treatment at 600° C., it is observed that particles have the elongated structure and the minor axis length of about 100 nm.

It is assessed to be formed by rolling the small particles obtained by the heat treatment at 600° C. after rapid cooling.

When undergoing further heat treatment at 600° C. for 1 hour after the cold rolling (c), it is found that the small particles of around 100 nm disappear according to the Oswald ripening phenomenon, and the particles are grown to extend in the crystal direction of large particles.

When the further heat treatment is performed at greater than or equal to 1000° C. (d), it is observed as a single crystal on the TEM, and the particle is observed to become very large.

The particle is continuously grown at greater than or equal to 1000° C. to have a micro-structure in which the grain boundary almost disappears.

FIG. 6 shows EBSD photographs of the microcrystalline structure of metal strip specimens obtained by slicing a specimen having undergone arc melting to a thickness of 400 μm, performing the heat treatment in a vacuum furnace at 600° C. for 10 minutes, and performing the cold rolling to provide a metal strip, wherein (a) shows the specimen having undergone no further heat treatment, and (b) and (c) show the specimens having undergone further heat treatment at 600° C. (b) and 1200° C. (c).

(a) shows that the micro-particles are present after the cold rolling, but (b) and (c) show that these micro-particles disappear by the further heat treatment after the rolling.

In the case of performing the further heat treatment at 1200° C. (c), the elongated structure formed on rolling disappears by growing the crystal particles from several tens of micrometers to greater than or equal to 100 μm and by being almost all formed with the isotropic particles.

It is confirmed that the micro-particles disappear to grow the particles, but the elongated structure is maintained as it was when undergoing the heat treatment at 600° C.

In this case the crystal particles have an average minor axis length of about 5 μm (standard deviation of 2.3 μm) and an aspect ratio of about 1:10.

Three to five photographs are used for each specimen when it is measured, and in this case, the number of crystal particles is greater than or equal to about 100 each.

To measure the minor axis length and the aspect ratio of the crystal particles, the Image-Pro Plus (Media Cybernetics, Inc.) program is used with the EBSD photographs by selecting items of size, width, and an aspect in the program.

The aspect ratio of the particles is measured as a ratio of the longest maximum axis to the shortest minimum axis in the effective oval size of the particles, and the minor axis length is measured as the shortest minimum axis length of the particles.

Example 3: Fabrication of Hydrogen Separation Membrane and Evaluation of Hydrogen Permeability The metal strips obtained by performing the further heat treatment at a different temperature after the cold rolling from Example 1 and Example 2 are made in a circle plate having a diameter of 5.5 mm and deposited with a catalyst layer (Pd, 100 μm) to provide a hydrogen separation membrane.

In addition, for the obtained hydrogen separation membranes, hydrogen permeability is evaluated, and the results are shown in FIG. 7 (including the separation membrane obtained from Example 1) and FIG. 8 (including the separation membrane obtained from Example 2).

The hydrogen permeability is measured by constantly maintaining the exposed area of an inlet and outlet for hydrogen in the separation membrane at 0.23 cm² and by maintaining a pressure difference between inlet and outlet for hydrogen at 7 bar.

In FIG. 7, it is understood that the V—Ni—Pt separation membranes obtained by performing the further heat treatment at 1200° C. (e) for 1 hour and at 1400° C. (f) for 30 minutes have a lower hydrogen permeability than that of a specimen undergoing no further heat treatment (a); on the other hand, the hydrogen permeability is improved in specimens undergoing the further heat treatment at 800° C. (d), 600° C. (c), and 400° C. (b), which are lower than 1000° C., for 1 hour each.

Also, from the results shown in FIG. 8, it is found that the V—Al—Fe alloy separation membrane undergoing the further heat treatment at 1400° C. (d), which is greater than 1000° C., for 30 minutes has lower permeability than that of the specimen undergoing no further heat treatment (a), but the specimens undergoing the further heat treatment at 600° C. (b) and at 800° C. (c), which are less than 1000° C., for 1 hour each, have improved permeability.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A separation membrane comprising
a Group 5 alloy,
wherein the alloy comprises crystal particles having an average minor axis length of 3 micrometers to 10 micrometers and an aspect ratio of 1:8 to 1:20, and
wherein the Group 5 alloy is represented by Chemical Formula 1:

$$A_xB_yC_z \qquad \text{Chemical Formula 1}$$

wherein in Chemical Formula 1,
A is vanadium,
B is nickel or aluminum, and C is platinum or iron,
x is a real number of greater than or equal to 0.8 and less than 1,
y+z=1−x, and y and z are each independently real numbers of greater than 0.

2. The separation membrane of claim 1, wherein the crystal particles in the alloy have an average minor axis length of 5 micrometers and an aspect ratio of 1:10.

3. The separation membrane of claim 1, wherein in Chemical Formula 1, x is 0.85 to 0.95, y is 0.03 to 0.08, and z is 0.01 to 0.06.

4. The separation membrane of claim 1, wherein the alloy comprises vanadium, nickel, and platinum, or the alloy comprises vanadium, aluminum, and iron.

5. The separation membrane of claim 1, wherein the alloy has a body-centered cubic crystal structure.

6. The separation membrane of claim 5, wherein the body-centered cubic structure has a lattice constant of 3.2 Angstroms to 3.4 Angstroms.

7. The separation membrane of claim 1, wherein the separation membrane has a dense layer structure having porosity of less than 1 percent by volume.

8. The separation membrane of claim 1, wherein a thickness of the separation membrane is 1 micrometers to 1000 micrometers.

9. A hydrogen separation membrane comprising the separation membrane according to claim 1.

10. The hydrogen separation membrane of claim 9, wherein the separation membrane further comprises a catalyst layer comprising palladium, platinum, ruthenium, iridium, or a combination thereof, wherein the catalyst layer is disposed on a side of the hydrogen separation membrane.

11. The hydrogen separation membrane of claim 9, wherein hydrogen permeability of the hydrogen separation membrane is $1.0 \times 10^{-8}$ mol/m*s*Pa$^{1/2}$ to about $1.0 \times 10^{-7}$ mol/m*s*Pa$^{1/2}$ when determined at a temperature of 300° C. to 500° C.

12. A method of manufacturing a separation membrane including a Group 5 alloy, the method comprising:
providing a Group 5 alloy comprising a Group 5 element;
heat-treating the Group 5 alloy to provide a heat-treated alloy cold-rolling the heat-treated alloy, and
further heat-treating the cold-rolled alloy to provide the separation membrane, wherein the further heat-treated alloy comprises crystal particles having an average minor axis length of 3 micrometers to 10 micrometers and an aspect ratio of 1:8 to 1:20,
wherein the Group 5 alloy is represented by Chemical Formula 1:

$$A_xB_yC_z \qquad \text{Chemical Formula 1}$$

wherein in Chemical Formula 1,
A is vanadium,
B is nickel or aluminum,
C is platinum or iron,
x is a real number of greater than or equal to 0.8 and less than 1,
y+z=1−x, and y and z are each independently real numbers of greater than 0.

13. The method of claim 12, wherein the cold-rolled alloy before the further heat-treating comprises crystal particles having an average diameter of 180 micrometers to 220 micrometers.

14. The method of claim 12, wherein the further heat-treated alloy comprises crystal particles having an average minor axis length of 5 micrometers and an aspect ratio of 1:10.

15. The method of claim 12, wherein the heat-treating before the cold rolling is performed at between 500° C. and 800° C.

16. The method of claim 12, wherein the further heat-treating after the cold rolling is performed at between 500° C. and 800° C.

17. The method of claim 12, wherein, in Chemical Formula 1, x is 0.85 to 0.95, y is 0.03 to 0.08, and z is 0.01 to 0.06.

* * * * *